US009257867B2

(12) United States Patent
Masuda et al.

(10) Patent No.: US 9,257,867 B2
(45) Date of Patent: Feb. 9, 2016

(54) VEHICLE

(75) Inventors: Tomokazu Masuda, Kasugai (JP); Takahiro Ito, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 611 days.

(21) Appl. No.: 13/518,748

(22) PCT Filed: Jan. 18, 2010

(86) PCT No.: PCT/JP2010/050472
§ 371 (c)(1),
(2), (4) Date: Jun. 22, 2012

(87) PCT Pub. No.: WO2011/086695
PCT Pub. Date: Jul. 21, 2011

(65) Prior Publication Data
US 2012/0274277 A1 Nov. 1, 2012

(51) Int. Cl.
*H02J 7/00* (2006.01)
*H02J 7/04* (2006.01)
*B60L 11/18* (2006.01)
(Continued)

(52) U.S. Cl.
CPC ... *H02J 7/04* (2013.01); *B60L 1/00* (2013.01); *B60L 1/003* (2013.01); *B60L 11/123* (2013.01); *B60L 11/14* (2013.01); *B60L 11/1811* (2013.01); *B60L 11/1816* (2013.01); *B60L 2210/10* (2013.01); *B60L 2210/30* (2013.01); *B60L 2210/40* (2013.01); *B60L 2240/34* (2013.01); *Y02T 10/6217* (2013.01); *Y02T 10/7005* (2013.01); *Y02T 10/7077* (2013.01); 
(Continued)

(58) Field of Classification Search
CPC ........... B60L 2200/36; B60L 11/1846; B60L 2230/34; B60L 11/1825; B60L 11/1844; B60L 11/1866; B60L 2240/72; H02J 7/0055; H02J 7/025; H02J 5/005; H02J 7/0054; H02J 17/00; H02J 7/0006; H02J 7/0008
USPC .................................................. 320/105–112
See application file for complete search history.

(56) References Cited

U.S. PATENT DOCUMENTS

2009/0096416 A1* 4/2009 Tonegawa et al. ............ 320/109
2009/0121659 A1* 5/2009 Oyobe et al. ..................... 318/12
(Continued)

FOREIGN PATENT DOCUMENTS

JP   A-2008-296669    12/2008
JP   A-2009-022061    1/2009
(Continued)

OTHER PUBLICATIONS

Mar. 30, 2010 International Search Report issued in International Application No. PCT/JP2010/050472 (with translation).

*Primary Examiner* — Binh Tat
(74) *Attorney, Agent, or Firm* — Oliff PLC

(57) ABSTRACT

An externally chargeable vehicle which is charged with electric power from an external power supply includes an HV-ECU for controlling a power storage device during any of operation of the vehicle and external charging, and a PLG-ECU for controlling a charging device during external charging. With such a configuration, running and charging can be controlled while a function of the HV-ECU for controlling operation of the vehicle and a function of the PLG-ECU for external charging is prevented from becoming redundant.

7 Claims, 12 Drawing Sheets

(51) Int. Cl.
  *B60L 1/00* (2006.01)
  *B60L 11/12* (2006.01)
  *B60L 11/14* (2006.01)

(52) U.S. Cl.
  CPC .......... *Y02T10/7216* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 2010/0121507 A1 | 5/2010 | Ishii et al. | |
| 2011/0127956 A1* | 6/2011 | Mitsutani | 320/109 |
| 2011/0175569 A1* | 7/2011 | Austin | 320/109 |
| 2011/0187184 A1 | 8/2011 | Ichikawa | |
| 2012/0123625 A1 | 5/2012 | Ueo et al. | |
| 2012/0187759 A1 | 7/2012 | Kamichi et al. | |
| 2012/0319648 A1* | 12/2012 | Ohtomo | 320/109 |

FOREIGN PATENT DOCUMENTS

| | | |
|---|---|---|
| JP | A-2009-071901 | 4/2009 |
| JP | A-2009-225587 | 10/2009 |
| JP | A-2009-296820 | 12/2009 |
| JP | A-2009-296844 | 12/2009 |
| JP | A-2010-279159 | 12/2010 |
| JP | B2-4957873 | 6/2012 |
| JP | B2-4993036 | 8/2012 |
| WO | WO 2008/133287 A1 | 11/2008 |
| WO | WO 2009/116311 A1 | 9/2009 |
| WO | WO 2011/016134 A1 | 2/2011 |
| WO | WO 2011/016135 A1 | 2/2011 |

* cited by examiner

VEHICLE

TECHNICAL FIELD

The present invention relates to a vehicle, and more particularly to control of a vehicle which can be charged with electric power from an external power supply outside the vehicle.

BACKGROUND ART

Recently, a vehicle incorporating a power storage device (such as a secondary battery or a capacitor) and running with drive force generated from electric power stored in the power storage device has attracted attention as an environmentally friendly vehicle. Such a vehicle includes, for example, an electric car, a hybrid car, a fuel cell car, and the like. A technique for charging the power storage device mounted on such a vehicle with a commercial power supply high in power generation efficiency has been proposed.

Among hybrid vehicles, as in the case of electric cars, a vehicle in which a power storage device mounted thereon can be charged by a power supply outside the vehicle (hereinafter also simply referred to as an "external power supply") has been known. For example, what is called a "plug-in hybrid vehicle" in which a power storage device can be charged by a power supply in a general household by connecting a power outlet provided in a house and a charge port provided in the vehicle to each other through a charge cable has been known. Improvement in fuel efficiency of a hybrid car can thus be expected.

Japanese Patent Laying-Open No. 2009-225587 (PTL 1) discloses a configuration in an electrically powered vehicle incorporating a power storage device that can be charged with an external power supply, in which a control device for external charging is separate from a control device for controlling a vehicle drive system (MG-ECU) and a control device for controlling a battery (a battery ECU).

CITATION LIST

Patent Literature

PTL 1: Japanese Patent Laying-Open No. 2009-225587

SUMMARY OF INVENTION

Technical Problem

In the configuration disclosed in Japanese Patent Laying-Open No. 2009-225587 (PTL 1), a control device 5 for external charging is configured to control other control devices, auxiliary machinery, relays, and the like. Therefore, when specifications and design of parts other than matters relating to external charging are modified in a vehicle as well, in some cases, control by this control device 5 has to be modified significantly.

For example, a case where a control device used during external charging and a control device used during operation of a vehicle are completely separate from each other so that while one is started up, the other is stopped is also considered. In such a case, however, a function for battery control required during both of external charging and operation of the vehicle should be provided to both control devices. Then, if modification to a redundant function such as modification of specifications of a battery is to be made, both control devices should be modified. Consequently, not only cost for adaptation at the time of design modification increases but also control devices adapted to vehicles different in specifications are individually required, which leads to further increase in cost such as interference with mass production or a large number of stocks required.

The present invention was made to solve such problems. An object of the present invention is to control running and charging while preventing a function of a control device for controlling operation of a vehicle and a function of a control device for external charging during both of operation of the vehicle and external charging from becoming redundant, in a vehicle which can be charged with a power supply outside the vehicle.

Solution to Problem

A vehicle according to the present invention is an externally chargeable vehicle, which is charged with electric power from an external power supply, and it includes a chargeable power storage device, a first control device, a charging device, a second control device, and a drive portion. The first control device controls the power storage device during any of operation of the vehicle and external charging. The charging device charges the power storage device with electric power from the external power supply. The second control device controls the charging device. The drive portion generates drive force for the vehicle with electric power from the power storage device.

Preferably, the first control device monitors a state of charge of the power storage device. Then, the second control device controls the charging device based on a signal in connection with the state of charge received from the first control device.

Preferably, the first control device is started up by a first start-up signal from the second control device. In addition, during external charging, the second control device is started up based on a signal indicating connection with the external power supply and outputs the first start-up signal to the first control device.

Preferably, when the vehicle is to be operated, both of the first control device and the second control device are started up based on a signal indicating start of operation of the vehicle.

Preferably, the vehicle further includes an auxiliary battery and a first power supply relay controlled by the first control device, for switching between supply and cut-off of electric power from the auxiliary battery. Then, the first control device is connected to the auxiliary battery with the first power supply relay being interposed.

Preferably, the vehicle further includes a second power supply relay controlled by the second control device, for switching between supply and cut-off of electric power from the auxiliary battery. Then, the second control device and the charging device are connected to the auxiliary battery with the second power supply relay being interposed.

Preferably, the vehicle further includes a second power supply relay controlled by the second control device, for switching between supply and cut-off of electric power from the auxiliary battery. The second control device is connected to the auxiliary battery with the first power supply relay being interposed. Then, the charging device is connected to the auxiliary battery with the second power supply relay being interposed.

Preferably, the second control device is started up by a second start-up signal from the first control device. Then, when the vehicle is to be operated, the first control device is started up based on a signal indicating start of operation of the vehicle and outputs the second start-up signal to the second control device.

Preferably, the vehicle further includes a switch interposed in a power line connecting the charging device and the power storage device to each other. Then, the first control device starts up the second control device when adhesion of a contact of the switch is to be detected and stops the second control device when detection of adhesion of the contact of the switch is completed.

Advantageous Effects of Invention

According to the present invention, in a vehicle which can be charged with a power supply outside the vehicle, running and charging can be controlled while a function of a control device for controlling operation of a vehicle and a function of a control device for external charging during both of operation of the vehicle and external charging are prevented from becoming redundant.

DESCRIPTION OF EMBODIMENTS

Figure 1:
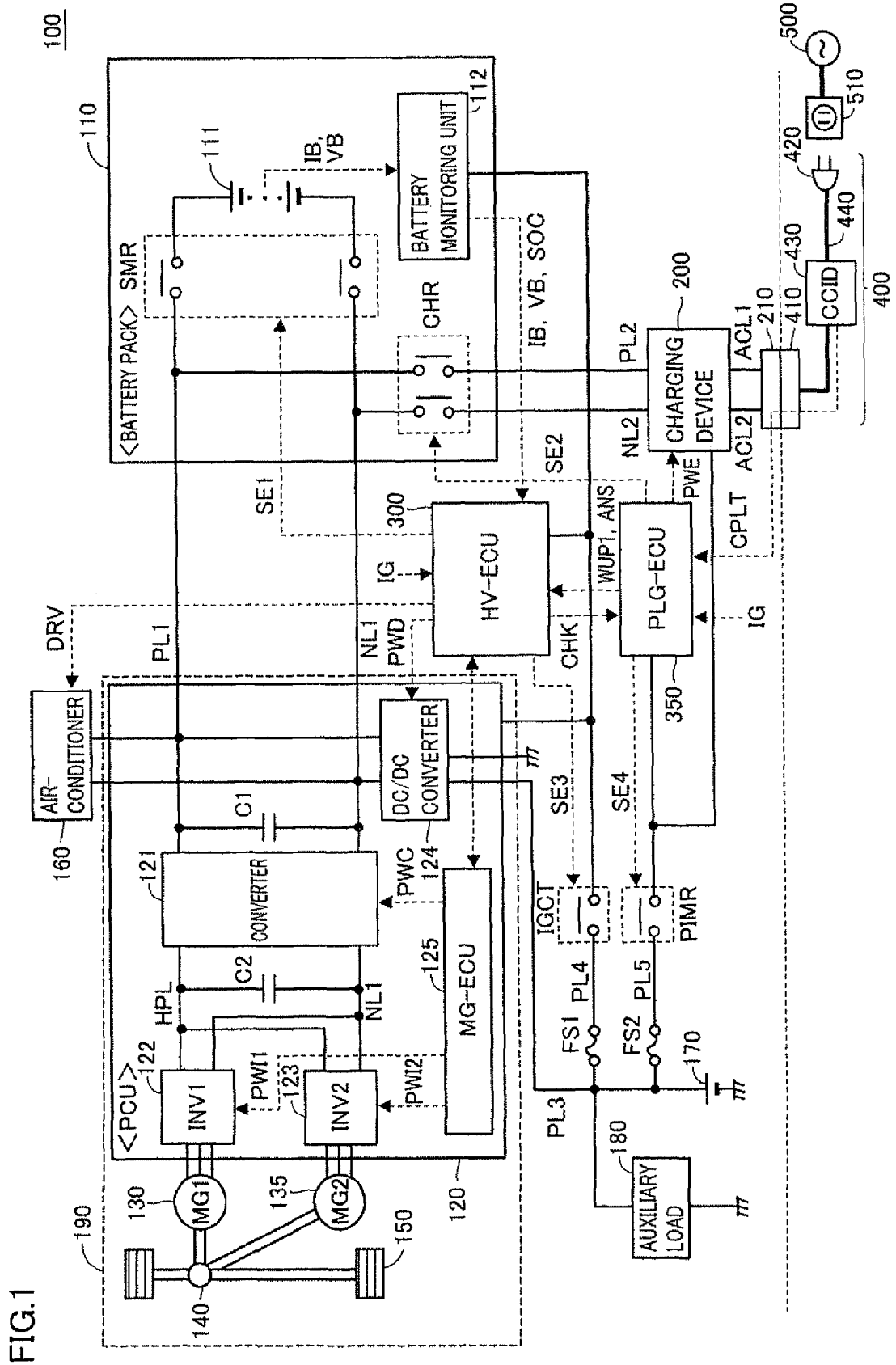
FIG. 1 is an overall block diagram of a vehicle according to a first embodiment.

An embodiment of the present invention will be described hereinafter in detail with reference to the drawings. In the drawings, the same or corresponding elements have the same reference characters allotted and description thereof will not be repeated.

[First Embodiment]

FIG. 1 is an overall block diagram of a vehicle 100 according to a first embodiment.

Referring to FIG. 1, vehicle 100 includes as features for driving vehicle 100, a battery pack 110, a PCU (Power Control Unit) 120 serving as a drive device, motor generators 130, 135, a motive power transmission gear 140, a drive wheel 150, and an HV-ECU (Electronic Control Unit) 300.

Battery pack 110 includes a power storage device 111, a system main relay (SMR), a battery monitoring unit 112, and a charge relay CHR.

Power storage device 111 is a power storage component configured to be chargeable and to be dischargeable. Power storage device 111 is configured to include, for example, a secondary battery such as a lithium ion battery, a nickel metal hydride battery, or a lead acid battery, a power storage element such as an electric double layer capacitor, and the like.

Power storage device 111 is connected to PCU 120 through a power line PL1 and a ground line NL1. Then, power storage device 111 supplies electric power for generating drive force for vehicle 100 to PCU 120. In addition, power storage device 111 stores electric power generated in motor generators 130, 135. Output of power storage device 111 is, for example, around 200 V.

A relay included in system main relay SMR is interposed in each of power line PL1 and ground line NL1 connecting power storage device 111 and PCU 120 to each other. Then, system main relay SMR switches between supply and cut-off of electric power between power storage device 111 and PCU 120, based on a control signal SE1 from vehicle ECU 300.

Battery monitoring unit 112 is a control unit for monitoring a status of power storage device 111. Battery monitoring unit 112 receives detection values of a voltage VB and a current IB of power storage device 111 detected by a voltage sensor and a current sensor provided in power storage device 111, neither of which is shown. Battery monitoring unit 112 calculates a state of charge (hereinafter also referred to as SOC) of power storage device 111 based on these detection values. Then, battery monitoring unit 112 outputs calculated SOC as well as voltage VB and current IB from each sensor to HV-ECU 300.

Charge relay CHR switches between supply and cut-off of electric power from a charging device which will be described later to power storage device 111 during external charging.

PCU 120 includes a converter 121, inverters 122, 123, capacitors C1, C2, a DC/DC converter 124, and an MG-ECU 125.

Converter 121 converts electric power between power line PL1, ground line NL1 and a power line HPL, ground line NL1, based on a control signal PWC from MG-ECU 125.

Inverters 122, 123 are connected in parallel to power line HPL and ground line NL1. Inverters 122, 123 are controlled based on control signals PWI1, PWI2 from MG-ECU 125 to drive motor generators 130, 135, respectively.

Capacitor C1 is provided between power line PL1 and ground line NL1 and it decreases voltage fluctuation between power line PL1 and ground line NL1. In addition, capacitor C2 is provided between power line HPL and ground line NL1 and it decreases voltage fluctuation between power line HPL and ground line NL1.

Motor generators 130, 135 are each an AC rotating electric machine, for example, a permanent magnet synchronous motor including a motor having a permanent magnet embedded.

Output torque of motor generators 130, 135 is transmitted to drive wheel 150 through motive power transmission gear 140 constituted of a reduction gear and a power split device to thereby run vehicle 100. Motor generators 130, 135 can generate electric power with rotational force of drive wheel 150 during a regenerative braking operation of vehicle 100. Then, PCU 120 causes generated electric power to be converted to electric power for charging power storage device 111. Alternatively, any one of motor generators 130, 135 may function exclusively as a motor, while the other motor generator may function exclusively as a generator.

Though FIG. 1 shows a configuration where two pairs of a motor generator and an inverter are provided, the number of motor generators and inverters is not limited as such. The configuration may be such that a single pair of a motor generator and an inverter is provided or more than two pairs thereof are provided.

In a hybrid car incorporating an engine (not shown) in addition to motor generators 130, 135, this engine and motor generators 130, 135 operate in coordination so that necessary vehicle drive force is generated. In this case, power storage device 111 can also be charged by using electric power generated as the engine rotates.

Namely, vehicle 100 in the present embodiment represents a vehicle incorporating a motor for generating vehicle drive force, and includes a hybrid car generating vehicle drive force by using an engine and a motor, an electric car and a fuel cell car not incorporating an engine, and the like.

MG-ECU 125 includes a CPU (Central Processing Unit), a storage device, and an input/output buffer, none of which is shown. MG-ECU 125 controls converter 121 and inverters 122, 123 in PCU 120, based on a torque command value or the like for motor generators 130, 135 received from HV-ECU 300. Control of these components is not limited to processing with software, and processing based on construction of dedicated hardware (electronic circuitry) may also be applicable.

DC/DC converter 124 is connected to power line PL1 and ground line NL1. DC/DC converter 124 is controlled by a control signal PWD from HV-ECU 300 and converts a DC voltage supplied from power storage device 111. Then, DC/DC converter 124 supplies a power supply current to an auxiliary load 180 through a power line PL3 and supplies a charging current to an auxiliary battery 170.

It is noted that a drive portion 190 is formed from PCU 120, motor generators 130, 135, motive power transmission gear 140, and drive wheel 150.

In addition, vehicle 100 further includes as another auxiliary load, an air-conditioner 160 for air-conditioning in a vehicle compartment. Air-conditioner 160 is connected to power line PL1 and ground line NL1 and controlled by a control signal DRV from HV-ECU 300.

HV-ECU 300 includes a CPU, a storage device, and an input/output buffer, none of which is shown in FIG. 1, receives input of a signal from each sensor or the like and outputs a control signal to each piece of equipment, and controls vehicle 100 and each piece of equipment. It is noted that control of these components is not limited to processing with software and processing with dedicated hardware (electronic circuitry) may also be applicable.

HV-ECU 300 is started up in response to a vehicle operation command IG or a start-up signal WUP1 from a PLG-ECU 350.

HV-ECU 300 controls charging and discharging of power storage device 111 (hereinafter also referred to as "battery control") based on information on power storage device 111 received from battery monitoring unit 112. In addition, HV-ECU 300 generates and outputs a control signal for controlling PCU 120, system main relay SMR, and the like. It is noted that a configuration may be such that a function of battery monitoring unit 112 is included in HV-ECU 300.

Vehicle 100 includes as features for charging power storage device 111 with electric power from an external power supply 500, an inlet 210, a charging device 200, charge relay CHR, and PLG-ECU 350.

Inlet 210 is provided in an outer surface of vehicle 100. A charge connector 410 of a charge cable 400 is connected to inlet 210. Then, electric power from external power supply 500 is transmitted to vehicle 100 through charge cable 400.

In addition to charge connector 410, charge cable 400 includes a plug 420 for connection to a socket 510 of external power supply 500 and an electric wire portion 440 for electrically connecting charge connector 410 and plug 420 to each other.

In addition, electric wire portion 440 includes a charging circuit interrupt device (CCID) 430 for switching between supply and cut-off of electric power from external power supply 500. When charge cable 400 is connected to vehicle 100 and external power supply 500, CCID 430 outputs to PLG-ECU 350, a pilot signal CPLT which is a signal indicating connection.

Charging device 200 is connected to inlet 210 through power lines ACL1, ACL2. In addition, charging device 200 is connected between system main relay SMR and PCU 120 in power line PL1 and ground line NL1, through a power line PL2 and a ground line NL2 with charge relay CHR being interposed.

Charging device 200 is controlled by a control signal PWE from PLG-ECU 350 and it converts AC power supplied from inlet 210 to electric power for charging power storage device 111.

Though charging device 200 is configured in FIG. 1 to be connected between system main relay SMR and PCU 120 in power line PL1 and ground line NL1 through power line PL2 and ground line NL2 as described above, as shown in a variation in FIG. 2, power line PL2 and ground line NL2 may be configured to be connected between power storage device 111 and system main relay SMR in power line PL1 and ground line NL1.

Referring again to FIG. 1, charge relay CHR is controlled by a control command SE2 from PLG-ECU 350 and it is closed when external charging is carried out. It is noted that a relay included in charge relay CHR can individually be operated by control command SE2.

Similarly to HV-ECU 300, PLG-ECU 350 is configured to include a CPU, a storage device, and an input/output buffer, none of which is shown. PLG-ECU 350 is a control device for controlling equipment required during external charging and it does not basically control a function required during operation of the vehicle.

PLG-ECU 350 is started up in response to pilot signal CPLT or vehicle operation command IG described above. During external charging, PLG-ECU 350 controls charging of power storage device 111 by controlling charging device 200, charge relay CHR, and the like, based on SOC of power storage device 111 calculated by HV-ECU 300. In addition, during operation of the vehicle, PLG-ECU 350 determines adhesion of charge relay CHR in response to an adhesion check command CHK received from HV-ECU 300. Then, PLG-ECU 350 outputs a determination result ANS to HV-ECU 300.

Though PLG-ECU 350 is configured to be separate from charging device 200 in FIG. 1, the configuration may be such that charging device 200 includes a function of PLG-ECU 350.

Supply of a power supply voltage for control to HV-ECU 300 and PLG-ECU 350 will now be described.

HV-ECU 300 is supplied with a power supply voltage for control, through a power line PL4 branched from power line PL3. In addition, power line PL4 is also connected to battery monitoring unit 112, PCU 120, and the like.

In power line PL4, a power supply relay IGCT connected in series with a fuse FS1 is interposed. Power supply relay IGCT is controlled to open and close by a control signal SE3 from HV-ECU 300, and it switches between supply and cut-off of a power supply voltage to HV-ECU 300, battery monitoring unit 112, PCU 120, and the like.

PLG-ECU 350 is supplied with a power supply voltage for control, through a power line PL5 branched from power line PL3. In addition, charging device 200 is also supplied with a power supply voltage through power line PL5.

In power line PL5, a power supply relay PIMR connected in series with a fuse FS2 is interposed. Power supply relay PIMR is controlled to open and close by a control signal SE4 from PLG-ECU 350, and it switches between supply and cut-off of a power supply voltage to PLG-ECU 350 and charging device 200.

Figure 3:
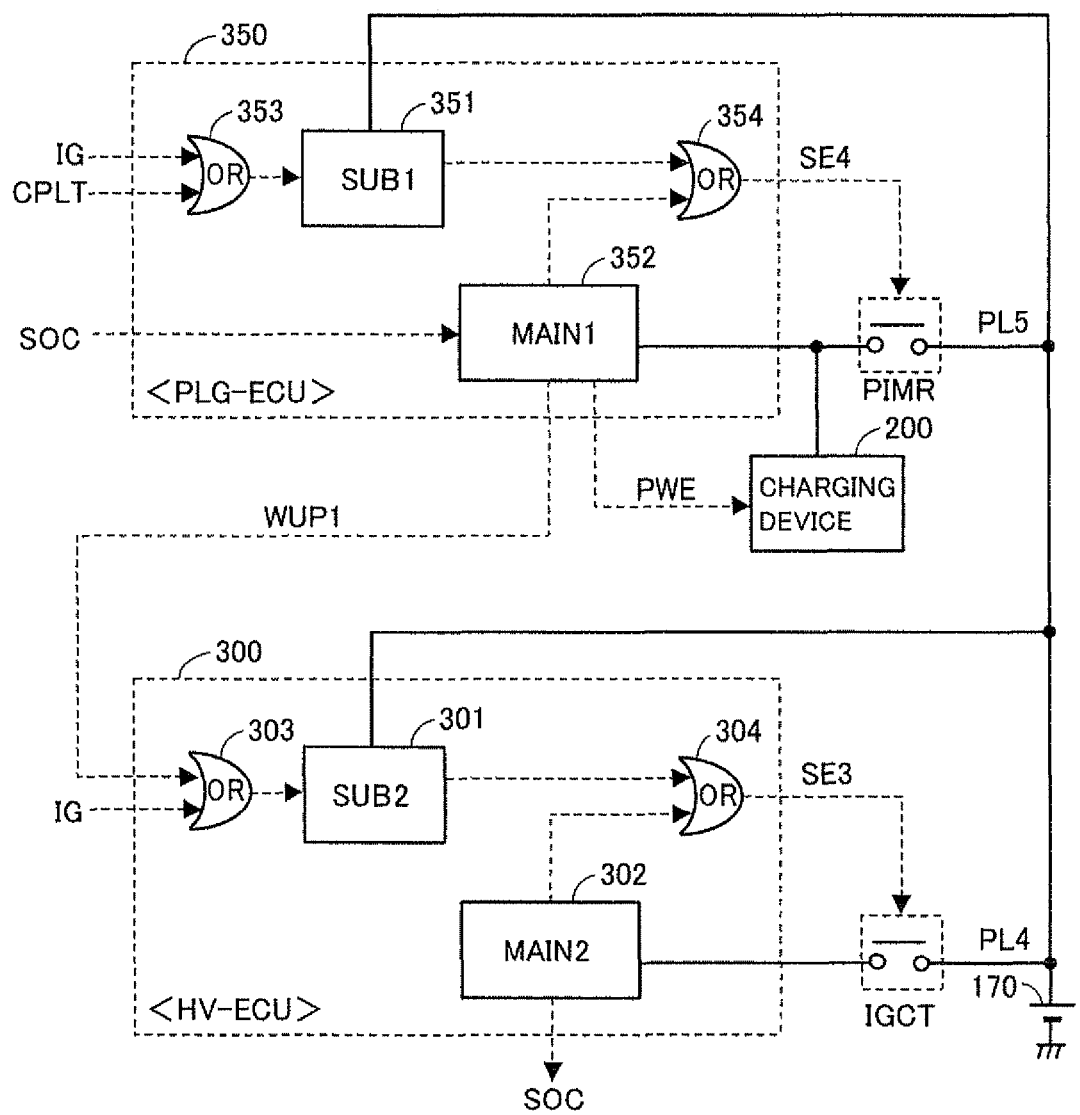
FIG. 3 is a diagram showing an internal configuration of an HV-ECU and a PLG-ECU in the first embodiment.

FIG. 3 shows a diagram showing an internal configuration of HV-ECU 300 and PLG-ECU 350 in the first embodiment.

Referring to FIG. 3, PLG-ECU 350 includes a sub unit 351, a main unit 352, and OR circuits 353, 354.

Sub unit 351 is a start-up circuit for starting up main unit 352. Sub unit 351 is normally supplied with a power supply voltage from auxiliary battery 170. Then, upon receiving vehicle operation command IG or pilot signal CPLT of charge cable 400 through OR circuit 353, sub unit 351 outputs a control signal for power supply relay PIMR through OR circuit 354 to close power supply relay PIMR. Thus, a power supply voltage is supplied to main unit 352 and charging device 200.

Main unit 352 is a control circuit for controlling charging of power storage device 111 during external charging. Main unit 352 is started up as power supply relay PIMR is closed and electric power is supplied through power line PL5. Then, main unit 352 itself also outputs a control signal for power supply relay PIMR. Then, main unit 352 controls charging device 200 based on SOC of power storage device 111 from HV-ECU 300.

In addition, when main unit 352 is started up, main unit 352 outputs start-up signal WUP1 to HV-ECU 300.

HV-ECU 300 includes a sub unit 301, a main unit 302, and OR circuits 303, 304.

Similarly to sub unit 351 in PLG-ECU 350 described above, sub unit 301 is a start-up circuit for starting up main unit 302 in HV-ECU 300 and it is normally supplied with a power supply voltage from auxiliary battery 170. Then, upon receiving vehicle operation command IG or start-up signal WUP1 from PLG-ECU 350 through OR circuit 303, sub unit 301 outputs a control command for power supply relay IGCT through OR circuit 304 to close power supply relay IGCT. Thus, a power supply voltage is supplied to main unit 302, PCU 120, and the like. Though FIG. 3 shows an example where a control signal from PLG-ECU 350 serves as start-up signal WUP1, a power supply voltage supplied as a result of closing of power supply relay PIMR may be made use of as start-up signal WUP1.

In vehicle 100 shown in FIG. 1 (or FIG. 2), as described above, the control device for controlling running of vehicle 100 (HV-ECU 300) and the control device for external charging (PLG-ECU 350) are functionally separate from each other, and they are designed such that their functions are not redundant. If a function of another control device is required, the control device having that function is configured to be started up by another control device. According to such a configuration, the following advantages are obtained.

For example, a case of control only by HV-ECU 300 during operation of the vehicle and control only by PLG-ECU 350 during external charging is considered. In this case, since charging and discharging of power storage device 111 should be controlled during both of running of the vehicle and external charging, consequently, both of HV-ECU 300 and PLG-ECU 350 should have a function for battery control. In addition, in order to check adhesion of charge relay CHR during operation of the vehicle, HV-ECU 300 should also control charge relay CHR. Namely, a function should be provided in a redundant manner.

Then, if specifications of a power storage device or battery control should be modified, both of HV-ECU 300 and PLG-ECU 350 should be modified. Moreover, if specifications or characteristics of the vehicle are different, for example in a case of a compact car and a large car, different PLG-ECU 350 adapted thereto should each be prepared. Then, types of products may increase, which may interfere mass production or lead to increase in stocks.

Therefore, as described above, by excluding a redundant function and functionally separating the control device for controlling running from the control device for external charging, correction at the time of design modification can be facilitated and a function of the control device on an external charging side can be compatible as much as possible. Consequently, productivity is improved and hence reduction in cost can be expected.

Figure 4:
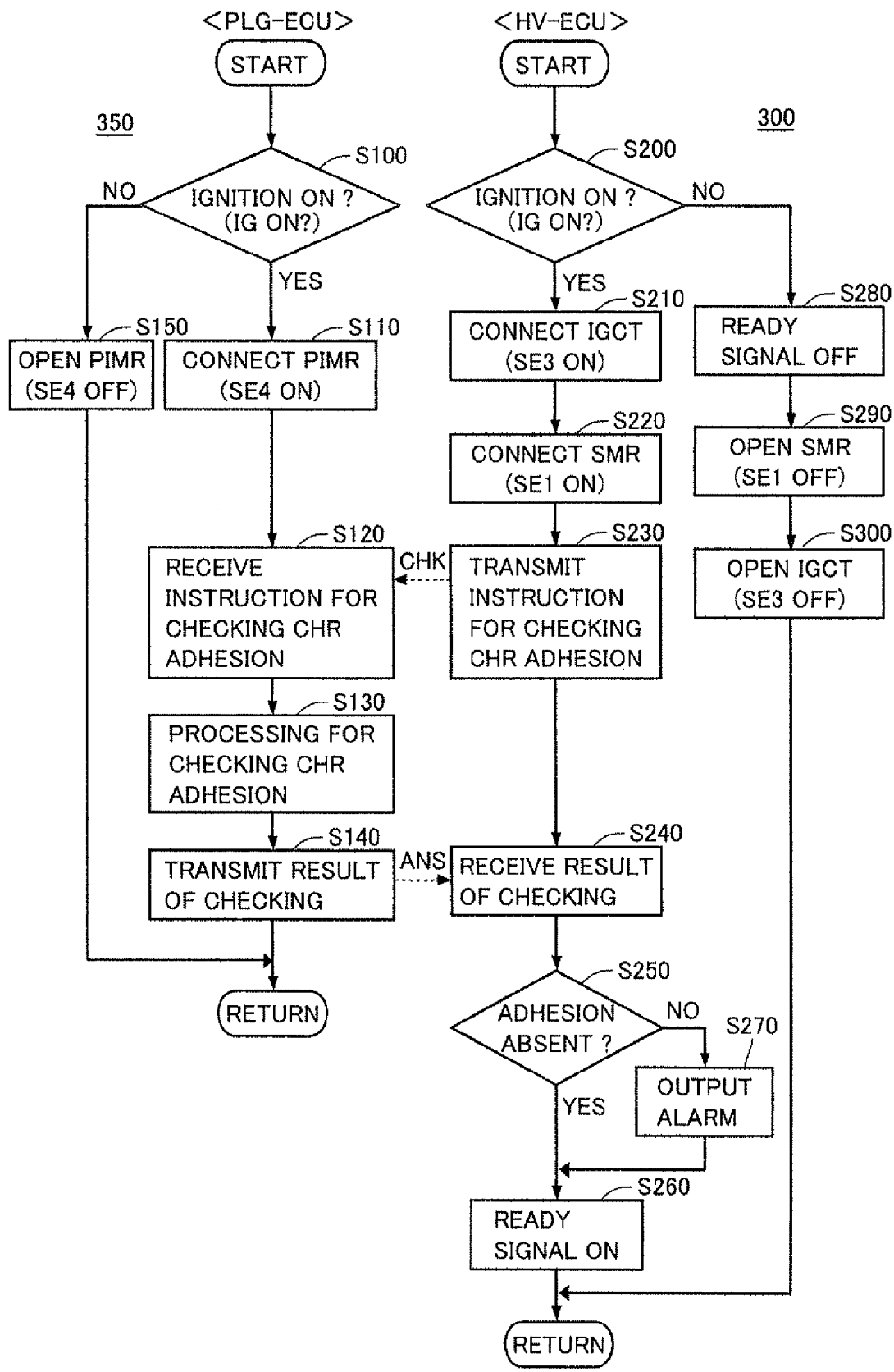
FIG. 4 is a flowchart for illustrating details of start-up control processing performed in the HV-ECU and the PLG-ECU at the time when operation of the vehicle is started in the first embodiment.
Figure 5:
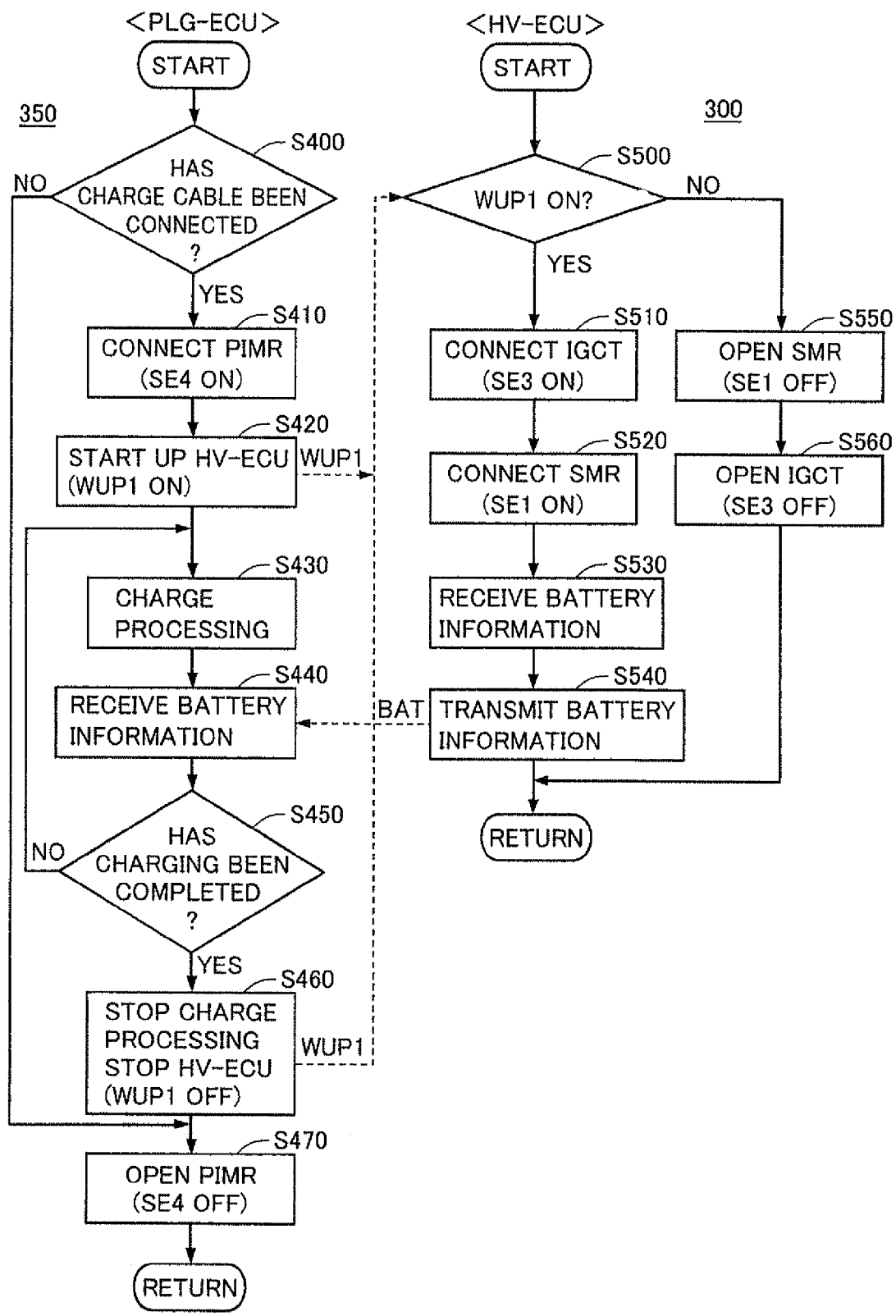
FIG. 5 is a flowchart for illustrating details of charge control processing performed in the HV-ECU and the PLG-ECU during external charging in the first embodiment.

Details of control during operation of vehicle 100 and external charging will now be described with reference to FIGS. 4 and 5. FIG. 4 is a flowchart for illustrating details of start-up control processing performed in HV-ECU 300 and PLG-ECU 350 at the time when operation of the vehicle is started in the first embodiment. FIG. 5 is a flowchart for illustrating details of charge control processing performed in HV-ECU 300 and PLG-ECU 350 during external charging. Each step in the flowcharts shown in FIGS. 4 and 5 and FIGS. 8, 11, and 12 which will be described later is performed as a program stored in advance in HV-ECU 300 and PLG-ECU 350 is called from a main routine and executed in a prescribed cycle. Alternatively, processing in some steps can also be performed by constructing dedicated hardware (electronic circuitry).

Control by HV-ECU 300 will initially be described with reference to FIGS. 1 and 4.

In step (hereinafter the step being abbreviated as S) 200, HV-ECU 300 determines whether ignition is ON or not, that is, whether operation of the vehicle has been started or not.

When ignition is ON (YES in S200), the process proceeds to S210, where HV-ECU 300 outputs control signal SE3 set to ON, to thereby connect power supply relay IGCT. In succession, in S220, HV-ECU 300 causes connection of system main relay SMR by outputting control signal SE1 set to ON.

Then, in S230, HV-ECU 300 transmits adhesion check command CHK to PLG-ECU 350 in order to check adhesion of charge relay CHR.

In response to this adhesion check command CHK, as will be described later, adhesion of charge relay CHR is determined by PLG-ECU 350. Then, in S240, HV-ECU 300 receives determination result ANS from PLG-ECU 350.

Then, in S250, HV-ECU 300 determines adhesion of charge relay CHR based on received determination result ANS.

When adhesion of charge relay CHR is absent (YES in S250), in S260, HV-ECU 300 sets a READY signal permitting operation start to ON. In response to ON of this READY signal, HV-ECU 300 starts control of each piece of equipment in order to operate the vehicle.

When adhesion of charge relay CHR is present (NO in S250), the process proceeds to S270, where HV-ECU 300 outputs an alarm through an alarm device (not shown) in a vehicle compartment in order to notify a driver of adhesion of charge relay CHR.

Even when charge relay CHR has adhered, normal running is not interfered and hence HV-ECU 300 successively allows the process to proceed to S260 and sets the READY signal to ON.

On the other hand, when ignition is OFF (NO in S200), the process proceeds to S280, where HV-ECU 300 sets the READY signal to OFF. Then, system main relay SMR is opened (S290) and IGCT is opened (S300). Thus, operation of vehicle 100 ends.

Control by PLG-ECU 350 will now be described.

In S100, PLG-ECU 350 determines whether ignition is ON or not.

When ignition is ON (YES in S100), the process proceeds to S110, where PLG-ECU 350 outputs control signal SE4 set to ON, to connect power supply relay PIMR.

Upon receiving adhesion check command CHK for charge relay CHR from HV-ECU 300 (S120), in S130, PLG-ECU 350 checks adhesion of charge relay CHR. Various already-known methods can be adopted as the method of determining adhesion of charge relay CHR.

Thereafter, in S140, PLG-ECU 350 transmits determination result ANS to HV-ECU 300.

On the other hand, when ignition is OFF (NO in S100), the process proceeds to S150, where PLG-ECU 350 causes power supply relay PIMR to open to thereby stop PLG-ECU 350 itself.

As a result of control in accordance with the processing as above, adhesion of charge relay CHR at the time when operation of the vehicle is started can be checked while redundancy of a function to control charge relay CHR in HV-ECU 300 and PLG-ECU 350 is avoided.

Control during external charging will now be described with reference to FIGS. 1 and 5.

Initially, control by PLG-ECU 350 will be described.

In S400, PLG-ECU 350 determines whether charge cable 400 has been connected or not, based on pilot signal CPLT from CCID 430 of charge cable 400.

When charge cable 400 has been connected (YES in S400), the process proceeds to S410, where PLG-ECU 350 outputs control signal SE4 set to ON, to connect power supply relay PIMR.

Then, PLG-ECU 350 outputs to HV-ECU 300, start-up signal WUP1 set to ON, to start up HV-ECU 300. As will be described later, in response thereto, HV-ECU 300 causes connection of system main relay SMR and carries out battery control of power storage device 111.

Then, in S430, PLG-ECU 350 controls charging device 200 and performs processing for charging power storage device 111.

In S440, PLG-ECU 350 receives battery information BAT from HV-ECU 300 and determines whether charging has been completed or not, based on SOC of power storage device 111 included in battery information BAT (S450).

When charging of power storage device 111 has not been completed (NO in S450), the process returns to S430, from which charge processing is continued.

On the other hand, when charging of power storage device 111 has been completed (YES in S450), the process proceeds to S460, where PLG-ECU 350 stops charge processing and sets start-up signal WUP1 to OFF, to thereby stop HV-ECU 300.

Thereafter, in S470, PLG-ECU 350 causes power supply relay PIMR to open to thereby end charge control.

On the other hand, when charge cable 400 has not been connected (NO in S400), external charging is not carried out. Therefore, in S470, PLG-ECU 350 causes power supply relay PIMR to open and the process ends.

Control by HV-ECU 300 will now be described.

In S500, HV-ECU 300 determines whether start-up signal WUP1 from PLG-ECU 350 has been set to ON or not.

When start-up signal WUP1 has been set to ON (YES in S500), the process proceeds to S510, where HV-ECU 300 outputs control signal SE3 set to ON, to connect power supply relay IGCT. In succession, in S520, HV-ECU 300 outputs control signal SE1 set to ON, to connect system main relay SMR.

In S530, HV-ECU 300 performs battery control processing for power storage device 111 and obtains information on power storage device 111. Then, HV-ECU 300 transmits battery information BAT including information on SOC of power storage device 111 to PLG-ECU 350.

On the other hand, when start-up signal WUP1 is OFF (NO in S500), the process proceeds to S550, where HV-ECU 300 causes system main relay SMR to open (S550) and causes power supply relay IGCT to open (S560), to thereby stop HV-ECU 300 itself.

Figure 2:
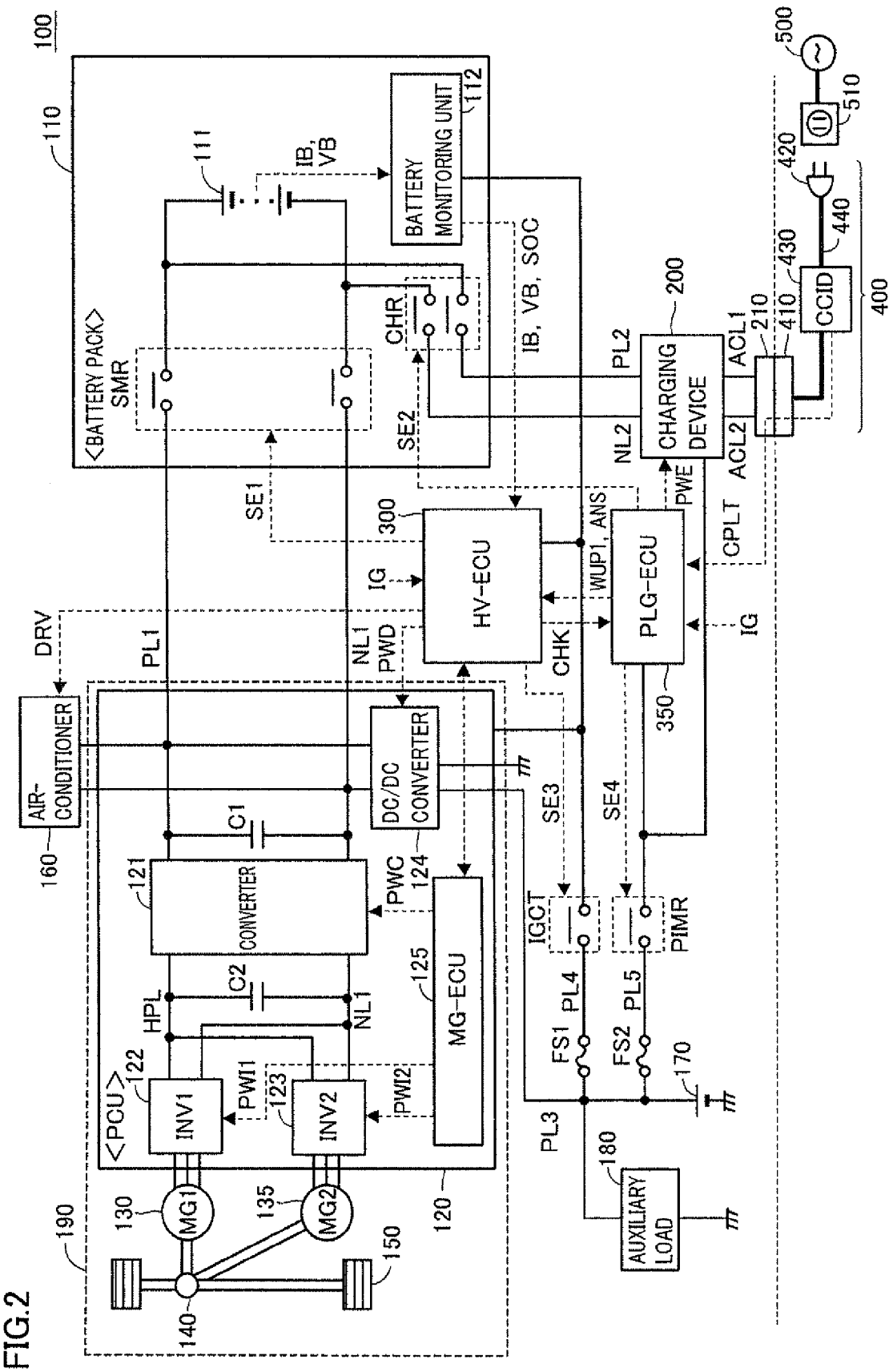
FIG. 2 is an overall block diagram of a vehicle according to a variation of the first embodiment.

In the case of the variation shown in FIG. 2, it is not necessary to close system main relay SMR during external charging, and therefore the processing in S520 and S550 above is not necessary.

As a result of control in accordance with the processing as above, external charging based on SOC of power storage device 111 can be carried out while redundancy of a function for battery control for power storage device 111 in HV-ECU 300 and PLG-ECU 350 is avoided.

By realizing a configuration described in the present first embodiment and carrying out control described with reference to FIGS. 4 and 5, running and charging can be controlled while redundancy of a function in HV-ECU 300 and PLG-ECU 350 during both of operation of the vehicle and external charging is avoided.

[Second Embodiment]

In the first embodiment, PLG-ECU 350 is normally in a started-up state also during operation of the vehicle. During operation of the vehicle, however, PLG-ECU 350 merely checks adhesion of charge relay CHR. In general, adhesion of charge relay CHR is not checked at all times during operation of the vehicle, but it is checked at the time when start-up of the vehicle is done or intermittently such as every predetermined time. Therefore, with PLG-ECU 350 being normally in a started-up state during operation of the vehicle as in the first embodiment, PLG-ECU 350 consumes unnecessary electric power.

Then, in the second embodiment, a configuration will be described, in which PLG-ECU 350 is started up in response to a command from HV-ECU 300 only when adhesion of charge relay CHR is to be checked during operation of the vehicle.

Figure 6:
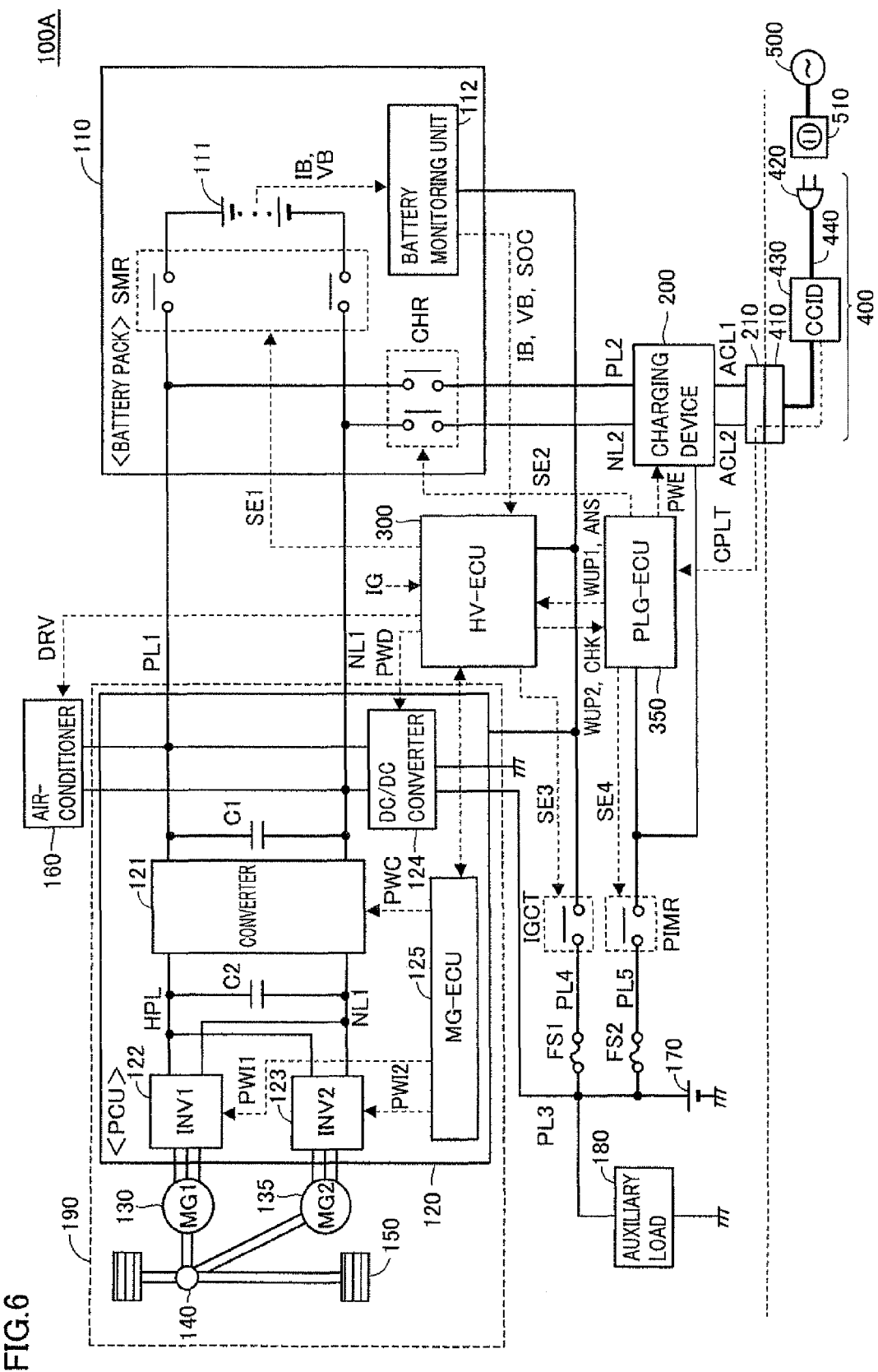
FIG. 6 is an overall block diagram of a vehicle according to a second embodiment.

FIG. 6 is an overall block diagram of a vehicle 100A according to the second embodiment. FIG. 6 is different from the configuration in the first embodiment in FIG. 1 in that a start-up signal WUP2 for PLG-ECU 350 is transmitted from HV-ECU 300 to PLG-ECU 350. Description of elements in FIG. 6 the same as in FIG. 1 will not be repeated.

Referring to FIG. 6, in the second embodiment, when vehicle operation command IG is ON at the time when vehicle 100A is to be operated, HV-ECU 300 causes power supply relay IGCT to close as in the first embodiment to thereby cause a power supply voltage to be supplied to HV-ECU 300. In the first embodiment, PLG-ECU 350 is started up in response to vehicle operation command IG so that PLG-ECU 350 causes power supply relay PIMR to close. In the second embodiment, however, PLG-ECU 350 is not started up even when vehicle operation command IG is ON.

In checking adhesion of charge relay CHR, HV-ECU 300 initially outputs start-up signal WUP2 to PLG-ECU 350. Then, after start-up of PLG-ECU 350 is completed, HV-ECU 300 outputs adhesion check command CHK for charge relay CHR to PLG-ECU 350. When PLG-ECU 350 completes checking of adhesion of charge relay CHR, HV-ECU 300 stops PLG-ECU 350 by turning off start-up signal WUP2.

PLG-ECU 350 is started up in response to start-up signal WUP2 from HV-ECU 300 and causes power supply relay PIMR to close to thereby cause a power supply voltage to be supplied to PLG-ECU 350. Then, in response to adhesion check command CHK from HV-ECU 300, adhesion of charge relay CHR is checked and a result thereof is output to HV-ECU 300. As start-up signal WUP2 is set to OFF, PLG-ECU 350 causes power supply relay PIMR to open to thereby stop processing in the PLG-ECU itself.

It is noted that operations of HV-ECU 300 and PLG-ECU 350 during external charging are the same as in the first embodiment.

Figure 7:
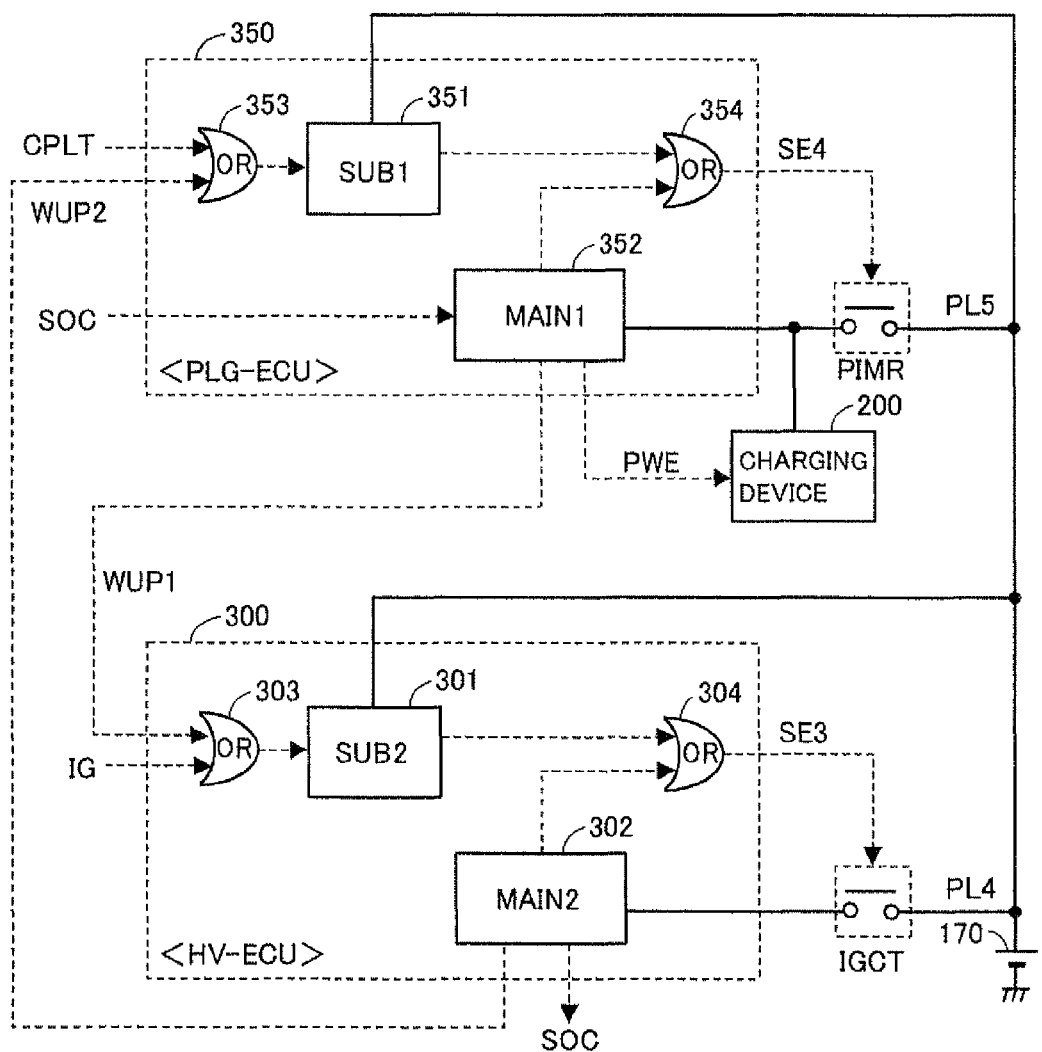
FIG. 7 is a diagram showing an internal configuration of the HV-ECU and the PLG-ECU in the second embodiment.

FIG. 7 is a diagram showing an internal configuration of HV-ECU 300 and PLG-ECU 350 in the second embodiment. FIG. 7 is different in that start-up signal WUP2 from HV-ECU 300 instead of operation command IG is input to the OR circuit in PLG-ECU 350 in FIG. 3 shown in the first embodiment. Description of elements in FIG. 7 the same as in FIG. 3 will not be repeated.

Referring to FIG. 7, main unit 302 in HV-ECU 300 outputs start-up signal WUP2 to PLG-ECU 350 when adhesion of charge relay CHR in FIG. 6 should be checked.

Upon receiving start-up command WUP2 from HV-ECU 300 in the vehicle or pilot signal CPLT of charge cable 400 through OR circuit 353, sub unit 351 in PLG-ECU 350 outputs a control command for power supply relay PIMR through OR circuit 354 to close power supply relay PIMR. Thus, a power supply voltage is supplied to main unit 352 and charging device 200.

By configuring such a circuit, only when a function by PLG-ECU 350 is required during operation of the vehicle, PLG-ECU 350 can be started up based on a command from HV-ECU 300.

Figure 8:
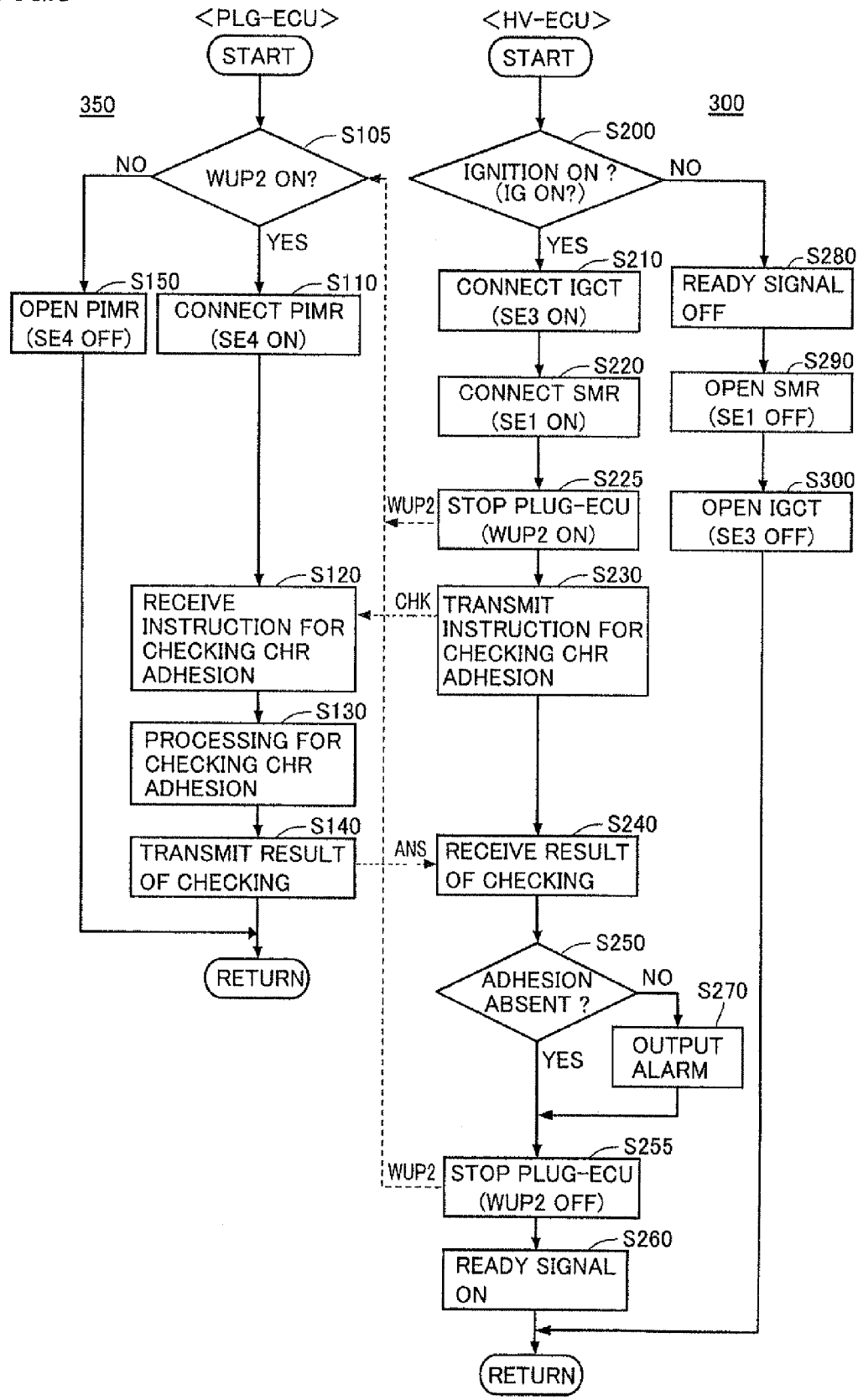
FIG. 8 is a flowchart for illustrating details of start-up control processing performed in the HV-ECU and the PLG-ECU at the time when operation of the vehicle is started in the second embodiment.

FIG. 8 is a flowchart for illustrating details of start-up control processing performed in HV-ECU 300 and PLG-ECU 350 at the time when operation of the vehicle is started in the second embodiment. In FIG. 8, step S100 for PLG-ECU 350 has been replaced with S105 and steps S225 and S255 are added for HV-ECU 300 as compared with the flowchart in the first embodiment in FIG. 4. Description of steps in FIG. 8 the same as in FIG. 4 will not be repeated.

Referring to FIGS. 6 and 8, when ignition is ON in S200 (YES in S200), HV-ECU 300 causes connection of IGCT (S210) and causes connection of system main relay SMR (S220).

Then, in order to have PLG-ECU 350 check adhesion of charge relay CHR, initially in S225, HV-ECU 300 starts up PLG-ECU 350 by transmitting start-up signal WUP2 to PLG-ECU 350.

Then, when HV-ECU 300 confirms that start-up of PLG-ECU 350 has been completed, in S230, HV-ECU 300 transmits adhesion check command CHK to PLG-ECU 350 in order to check adhesion of charge relay CHR.

In response to this adhesion check command CHK, PLG-ECU 350 determines whether or not charge relay CHR has adhered. Then, in S240, HV-ECU 300 receives determination result ANS from PLG-ECU 350.

Then, after HV-ECU 300 determines whether or not charge relay CHR has adhered based on received determination result ANS (S250), in S255, HV-ECU 300 sets start-up signal WUP2 to OFF in order to stop PLG-ECU 350, and transmits the signal to PLG-ECU 350. Thereafter, in S260, HV-ECU 300 sets the READY signal permitting start of operation to ON.

In S105, PLG-ECU 350 determines whether or not start-up signal WUP2 from HV-ECU 300 has been set to ON.

When start-up signal WUP2 has been set to ON (YES in S105), in S110, PLG-ECU 350 causes connection of power supply relay PIMR and causes a power supply voltage to be supplied to PLG-ECU 350 and charging device 200. Then, PLG-ECU 350 checks adhesion of charge relay CHR by performing processing from S120 to S140.

On the other hand, when start-up signal WUP2 has been set to OFF (NO in S105), in S150, PLG-ECU 350 causes power supply relay PIMR to open to thereby stop PLG-ECU 350 itself.

Since processing during external charging is the same as in FIG. 5 in connection with the first embodiment, description thereof will not be repeated. Though a case where adhesion of charge relay CHR is checked at the time when operation of the vehicle is started has been described above, for example, charge relay CHR may be checked every predetermined time after start of operation of the vehicle, and in that case, HV-ECU 300 may output start-up signal WUP2 to PLG-ECU 350 each time, to thereby start up PLG-ECU 350. Further, also in a case where, in addition to checking of adhesion of charge relay CHR, for example, such matters within the scope of control by PLG-ECU 350 as checking of whether or not charging device 200 is normal, are done during operation of the vehicle, PLG-ECU 350 may be started up each time in response to a command from HV-ECU 300.

As a result of control in accordance with the processing above, only when HV-ECU 300 requires during operation of the vehicle, PLG-ECU 350 can be started up so as to perform processing. Thus, running and charging can be controlled and electric power consumed by PLG-ECU 350 during operation of the vehicle can be reduced while redundancy of a function in HV-ECU 300 and PLG-ECU 350 during both of operation of the vehicle and external charging is avoided.

[Third Embodiment]

In the first embodiment, as described above, during operation of the vehicle, PLG-ECU 350 is normally in a started-up state. In addition, since power supply relay PIMR is connected, charging device 200 is also supplied with a power supply voltage and is in a started-up state, and thus unnecessary electric power is consumed in charging device 200.

Then, in the third embodiment, a configuration will be described, in which unnecessary power consumption by charging device 200 during operation of the vehicle is reduced by separating a source of supply of a power supply voltage for PLG-ECU 350 and charging device 200.

Figure 9:
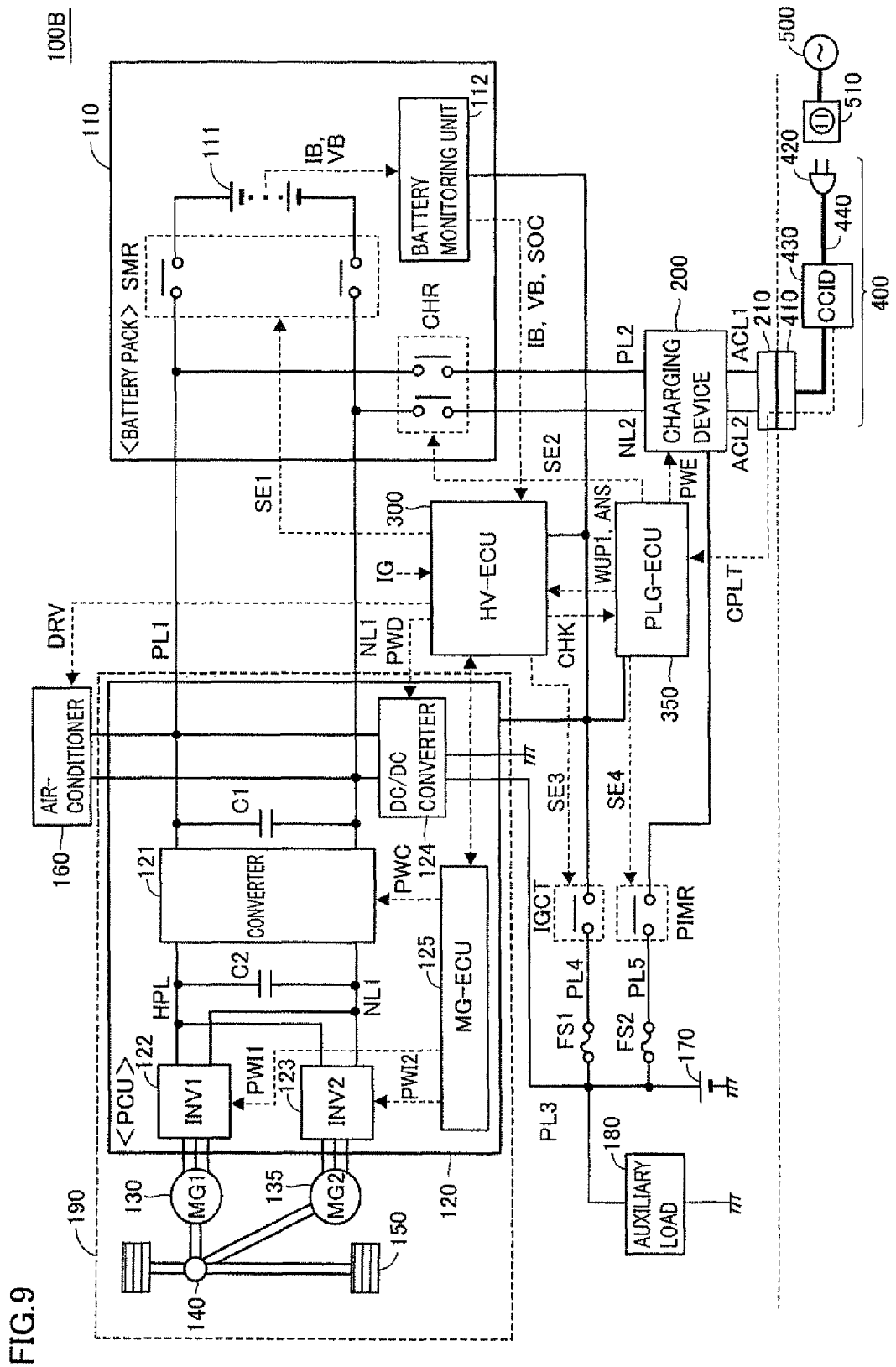
FIG. 9 is an overall block diagram of a vehicle according to a third embodiment.

FIG. 9 is an overall block diagram of a vehicle 100B according to the third embodiment. FIG. 9 is different from FIG. 1 in the first embodiment in that a power supply voltage for PLG-ECU 350 is supplied through power line PL4 as in the case of HV-ECU 300, instead of power line PL5. Description of elements in FIG. 9 the same as in FIG. 1 will not be repeated.

Referring to FIG. 9, when vehicle operation command IG is ON at the time of operation of vehicle 100B, HV-ECU 300 causes power supply relay IGCT to close as in the first embodiment and causes a power supply voltage to be supplied to HV-ECU 300. Thus, a power supply voltage is supplied also to PLG-ECU 350 and PLG-ECU 350 is started up. Then, in checking adhesion of charge relay CHR, HV-ECU 300 outputs adhesion check command CHK to PLG-ECU 350 so as to have PLG-ECU 350 perform processing for checking adhesion of charge relay CHR.

In the third embodiment, PLG-ECU 350 is started up as a power supply voltage is supplied through power line PL4.

During external charging, in response to pilot signal CPLT from CCID 430, PLG-ECU 350 outputs start-up signal WUP1 to HV-ECU 300. Then, in response to this start-up signal WUP1, HV-ECU 300 causes power supply relay IGCT to close. Thus, a power supply voltage is supplied to PLG-ECU 350 and thus PLG-ECU 350 is started up.

Figure 10:
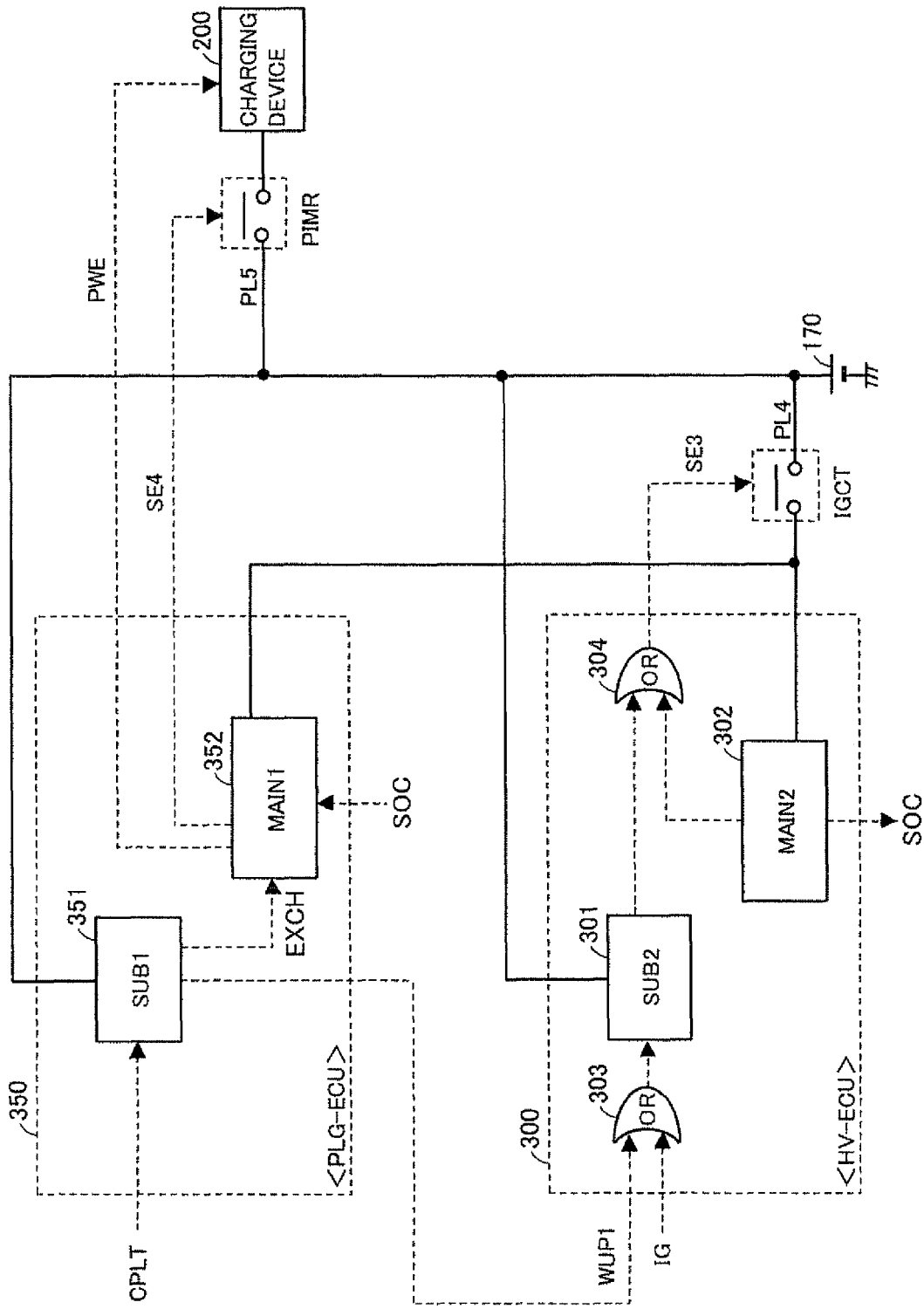
FIG. 10 is a diagram showing an internal configuration of the HV-ECU and the PLG-ECU in the third embodiment.

FIG. 10 is a diagram showing an internal configuration of HV-ECU 300 and PLG-ECU 350 in the third embodiment. FIG. 10 is different from FIG. 3 in the first embodiment in that OR circuits 353, 354 in PLG-ECU 350 have been eliminated and a power supply voltage is supplied to main unit 352 in PLG-ECU 350 through power line PL4 instead of power line PL5. Description of elements in FIG. 10 the same as in FIG. 3 will not be repeated.

Upon receiving pilot signal CPLT from CCID 430, sub unit 351 in PLG-ECU 350 outputs start-up signal WUP1 to HV-ECU 300. In addition, upon receiving pilot signal CPLT, sub unit 351 outputs to main unit 352, an external charging signal EXCH indicating external charging.

Main unit 352 in PLG-ECU 350 is started up as it is supplied with a power supply voltage through power line PL4. Upon receiving external charging signal EXCH from sub unit 351, main unit 352 outputs control signal SE4 to close power supply relay PIMR, so that charging device 200 is supplied with a power supply voltage.

By configuring such a circuit, only during external charging, a power supply voltage can be supplied to charging device 200.

Processing in each of HV-ECU 300 and PLG-ECU 350 during operation of the vehicle and external charging will now be described with reference to FIGS. 11 and 12.

Processing during operation of the vehicle will initially be described.

Figure 11:
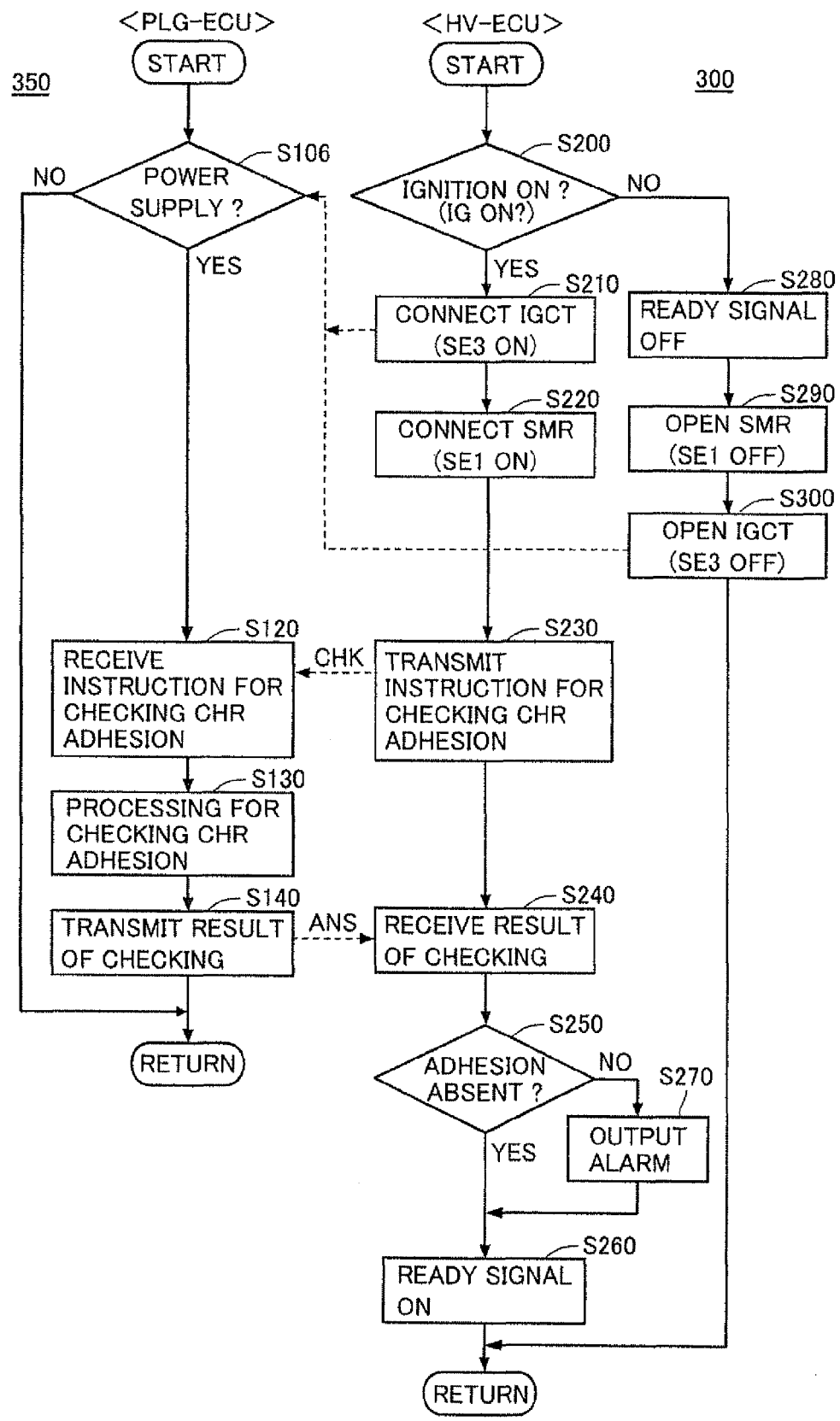
FIG. 11 is a flowchart for illustrating details of start-up control processing performed in the HV-ECU and the PLG-ECU at the time when operation of the vehicle is started in the third embodiment.

FIG. 11 is a flowchart for illustrating details of start-up control processing performed in HV-ECU 300 and PLG-ECU 350 at the time when operation of the vehicle is started in the third embodiment. In FIG. 11, step S100 for PLG-ECU 350 has been replaced with S106 and S110 and S150 have been deleted as compared with the flowchart in FIG. 4 in the first embodiment. Description of steps in FIG. 11 the same as in FIG. 4 will not be repeated.

Referring to FIGS. 9 and 11, in S106, PLG-ECU 350 determines whether or not power is supplied through power line PL4.

When power is supplied (YES in S106), the process proceeds to S120. Then, in response to adhesion check command CHK from HV-ECU 300, PLG-ECU 350 performs processing from S120 to S140.

On the other hand, when power is not supplied (NO in S106), PLG-ECU 350 stops itself so that the process ends.

Description of the processing by HV-ECU 300 is the same as the description of FIG. 4 in the first embodiment and it will not be repeated, however, HV-ECU 300 causes connection and opening of power supply relay IGCT in steps S210 and S300, so that supply and cut-off of a power supply voltage to PLG-ECU 350 are controlled.

Processing during external charging will now be described.

Figure 12:
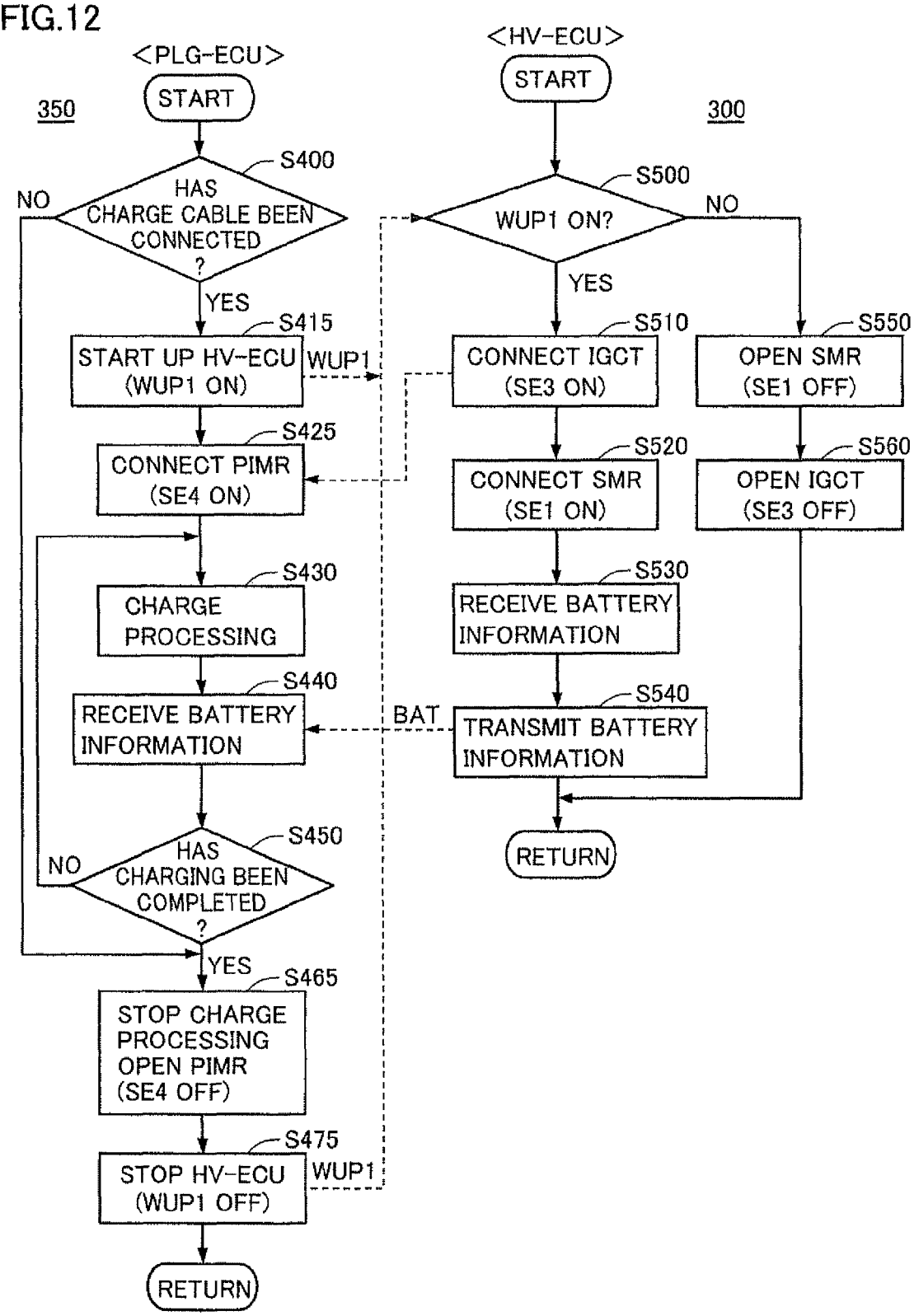
FIG. 12 is a flowchart for illustrating details of charge control processing performed in the HV-ECU and the PLG-ECU during external charging in the third embodiment.

FIG. 12 is a flowchart for illustrating details of charge control processing performed in HV-ECU 300 and PLG-ECU 350 during external charging in the third embodiment. In FIG. 12, steps S410, S420, S460, and S470 for PLG-ECU 350 have been replaced with S415, S425, S465, and S475, respectively, as compared with the flowchart in FIG. 5 in the first embodiment. Description of steps in FIG. 12 the same as in FIG. 5 will not be repeated.

Referring to FIGS. 9 and 12, when PLG-ECU 350 determines in S400 that charge cable 400 has been connected (YES in S400), the process proceeds to S415, where PLG-ECU 350 sets start-up signal WUP1 to ON and outputs the signal to HV-ECU 300, to thereby start up HV-ECU 300.

Then, when PLG-ECU 350 confirms that connection of power supply relay IGCT is caused by HV-ECU 300 and a power supply voltage is supplied through power line PL4, in S425, PLG-ECU 350 outputs control signal SE4 and causes connection of power supply relay PIMR, to thereby cause a power supply voltage to be supplied to charging device 200.

Thereafter, PLG-ECU 350 performs processing from S430 to S450 and controls charging device 200 to cause charging of power storage device 111.

When it is determined in S450 that charging of power storage device 111 has been completed (YES in S450), PLG-ECU 350 causes power supply relay PIMR to open to thereby stop charging device 200 (S465) and outputs start-up signal WUP1 set to OFF, to thereby stop HV-ECU 300 (S475).

On the other hand, when it is determined that charge cable 400 has not been connected (NO in S400), the process proceeds to S465, where PLG-ECU 350 causes power supply relay PIMR to open to thereby stop charging device 200 (S465) and outputs start-up signal WUP1 set to OFF, to thereby stop HV-ECU 300.

As a result of control in accordance with the processing as above, a source of supply of a power supply voltage for PLG-ECU 350 and charging device 200 can be separated. Thus, running and charging can be controlled and unnecessary electric power consumed by charging device 200 during operation of the vehicle can be reduced while redundancy of a function in HV-ECU 300 and PLG-ECU 350 during both of operation of the vehicle and the external charging is avoided.

It is noted that "HV-ECU 300" and "PLG-ECU 350" in the present embodiment represent examples of the "first control device" and the "second control device" in the present invention, respectively. The "IGCT" and the "PIMR" in the present embodiment represent examples of the "first power supply relay" and the "second power supply relay" in the present invention, respectively.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Reference Signs List 100, 100A, 100B vehicle; 110 battery pack; 111 power storage device; 112 battery monitoring unit; 121 converter; 122, 123 inverter; 124 DC/DC converter; 130, 135 motor generator; 140 motive power transmission gear; 150 drive wheel; 160 air-conditioner; 170 auxiliary battery; 180 auxiliary load; 190 drive portion; 200 charging device; 210 inlet; 300 HV-ECU, 301, 351 sub unit; 302, 352 main unit; 303, 304, 353, 354 OR circuit; 350 PLG-ECU; 351 sub unit; 352 main unit; 400 charge cable; 410 charge connector; 420 plug; 430 CCID; 440 electric wire portion; 500 external power supply; 510 socket; ACL1, ACL2, PL1 to PL5, HPL power line; C1, C2 capacitor; CHR charge relay; FS1, FS2 fuse; IGCT, PIMR power supply relay; NL1, NL2 ground line; and SMR system main relay.

The invention claimed is:

1. A vehicle externally chargeable, which is charged with electric power from an external power supply, comprising:
   a chargeable power storage device;
   a first control device for controlling said power storage device during any of operation of said vehicle and external charging;
   a charging device for charging said power storage device with electric power from said external power supply;
   a second control device for controlling said charging device;
   a drive portion configured to generate drive force for said vehicle with electric power from said power storage device; and
   a switch (CHR) interposed in a power line connecting said charging device and said power storage device to each other, wherein
   when said vehicle is to be operated, said first control device is started up as it is supplied with power in response to a signal indicating start of operation of said vehicle, and switches between start-up and stop of said second control device by controlling power supply to said second control device in accordance with need for control by said second control device, and
   said first control device starts up said second control device when adhesion of a contact of said switch (CHR) is to be detected.

2. The vehicle according to claim 1, wherein
   said first control device monitors a state of charge of said power storage device, and
   said second control device controls said charging device based on a signal in connection with said state of charge received from said first control device.

3. The vehicle according to claim 1, wherein
   during said external charging, said second control device is started up as it is supplied with power in response to a signal indicating connection with said external power supply and starts up said first control device by causing power supply to said first control device.

4. The vehicle according to claim 3, further comprising:
   an auxiliary battery; and
   a first power supply relay (IGCT) controlled by said first control device, for switching between supply and cut-off of electric power from said auxiliary battery, wherein
   said first control device is connected to said auxiliary battery with said first power supply relay (IGCT) being interposed.

5. The vehicle according to claim 4, further comprising a second power supply relay (PIMR) controlled by said second control device for switching between supply and cut-off of electric power from said auxiliary battery, wherein
   said second control device and said charging device are connected to said auxiliary battery with said second power supply relay (PIMR) being interposed.

6. The vehicle according to claim 4, further comprising a second power supply relay (PIMR) controlled by said second control device, for switching between supply and cut-off of electric power from said auxiliary battery, wherein
   said second control device is connected to said auxiliary battery with said first power supply relay (IGCT) being interposed, and
   said charging device is connected to said auxiliary battery with said second power supply relay (PIMR) being interposed.

7. The vehicle according to claim 1, wherein said first control device
   said second control device when detection of adhesion of the contact of said switch (CHR) is completed.

* * * * *

UNITED STATES PATENT AND TRADEMARK OFFICE
CERTIFICATE OF CORRECTION

PATENT NO. : 9,257,867 B2
APPLICATION NO. : 13/518748
DATED : February 9, 2016
INVENTOR(S) : Tomokazu Masuda et al.

It is certified that error appears in the above-identified patent and that said Letters Patent is hereby corrected as shown below:

On the Title of the Letters Patent:

For the (73) Assignee, please delete "Tokyo (JP)" and insert --Toyota (JP)--, therefore.

Signed and Sealed this
Nineteenth Day of July, 2016

Michelle K. Lee
*Director of the United States Patent and Trademark Office*